May 14, 1946.　　H. B. HOLTHOUSE　　2,400,117
HEATING APPARATUS
Filed May 11, 1942　　3 Sheets-Sheet 3
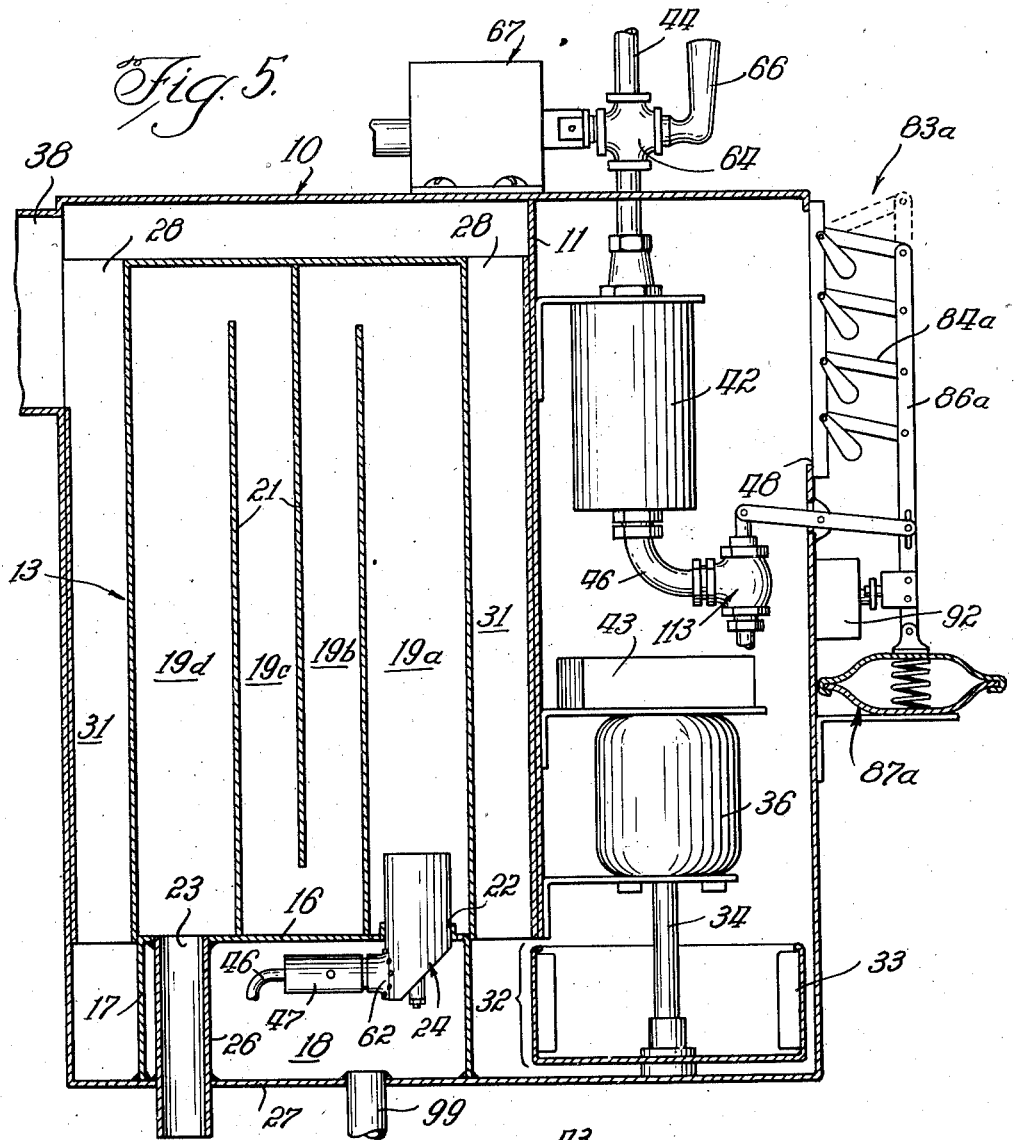
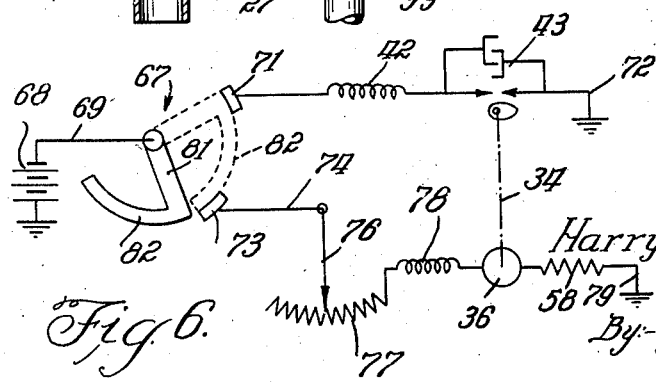
Inventor
Harry B. Holthouse
By Foorman L. Mueller
Atty.

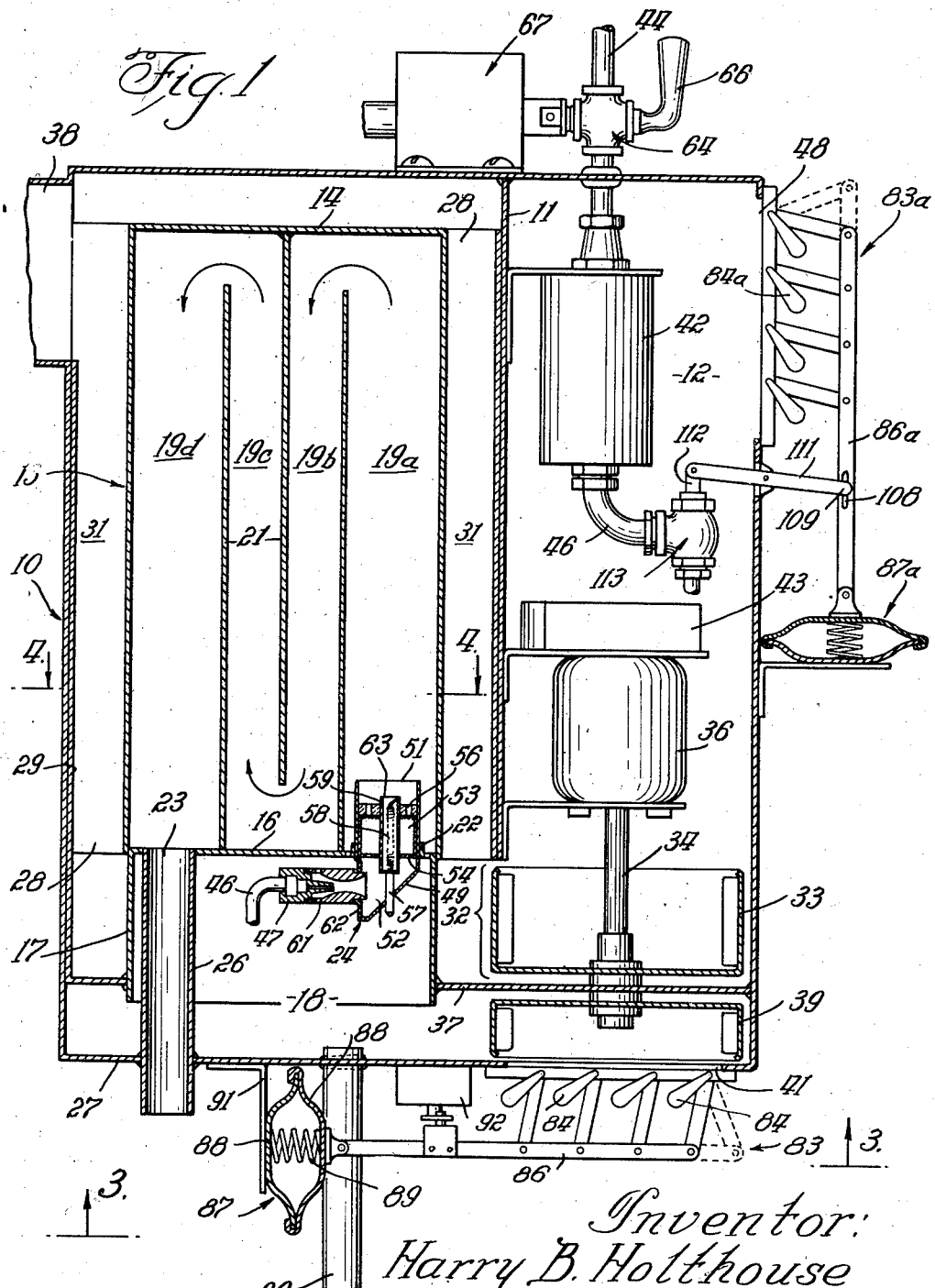

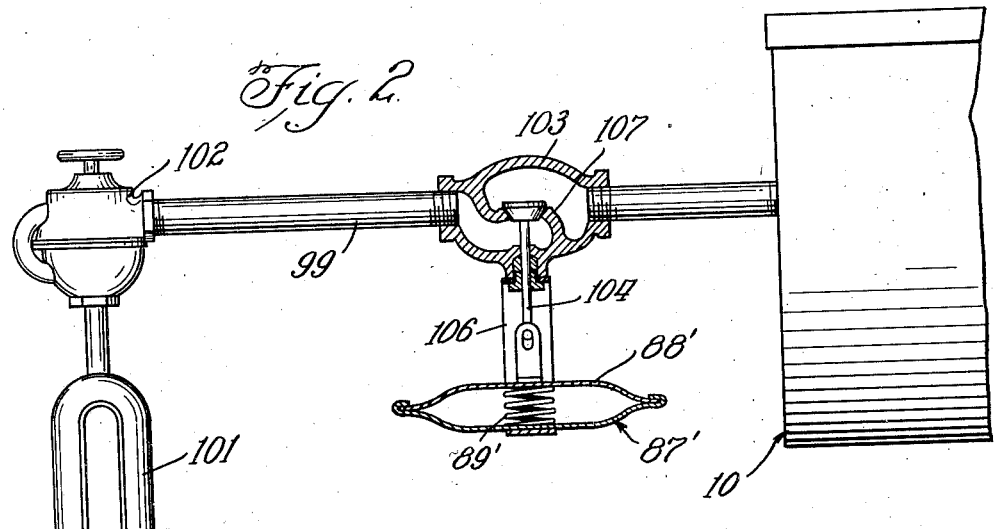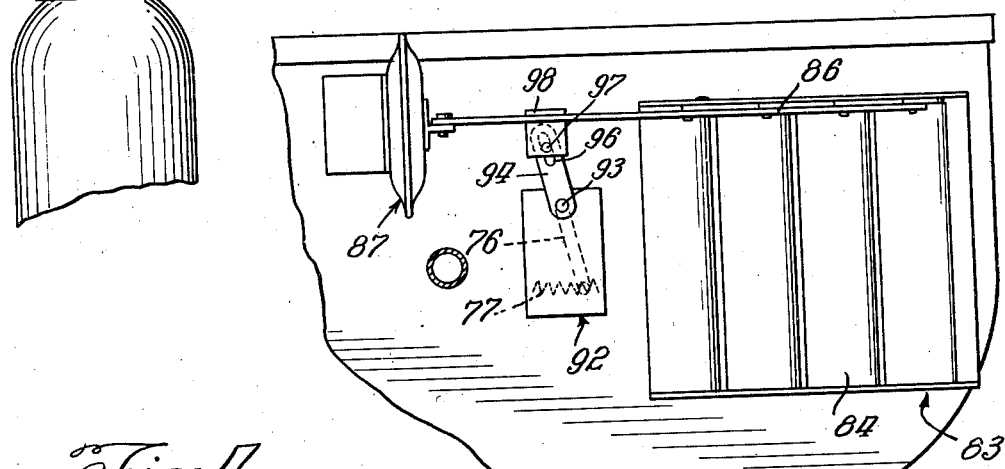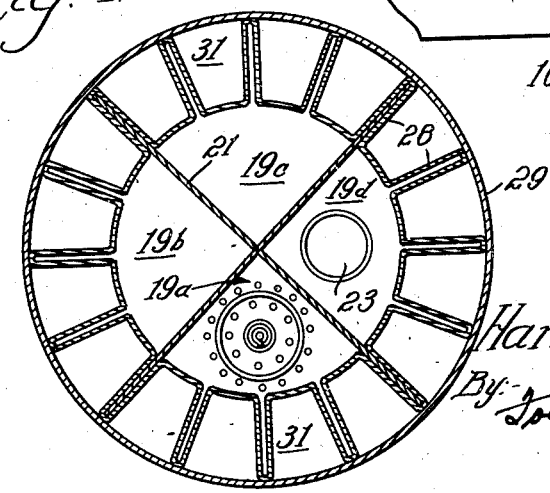

Patented May 14, 1946

2,400,117

UNITED STATES PATENT OFFICE 2,400,117

HEATING APPARATUS

Harry B. Holthouse, Chicago, Ill., assignor to Galvin Manufacturing Corporation, Chicago, Ill., a corporation of Illinois Application May 11, 1942, Serial No. 442,505

9 Claims. (Cl. 158—28)

This invention relates generally to heater apparatus and in particular to heater apparatus of internal combustion type adapted to operate over a wide range of altitudes in which the atmosphere varies in pressure and oxygen content. This is a continuation in part of application Serial No. 435,845 filed March 23, 1942.

Heating devices of internal combustion type are in common use for mobile craft for operating at ground temperature and atmosphere conditions. When used in an aircraft some of these heaters may operate satisfactorily up to altitudes of about 15,000 feet. However, at altitudes of 15,000 feet up to 35,000 feet and more the usual heating devices of the prior art are incapable of operating satisfactorily because of the reduced oxygen content in the rarified atmospheres at high altitudes and the cold temperatures encountered at such high altitudes. That is, the weight of oxygen for a given volume of air at high altitudes is less than the weight of oxygen in the same volume of air at sea level.

It is an object of this invention, therefore, to provide an improved heating device of internal combustion type.

A further object of this invention is to provide heater apparatus for aircraft in which ground level operating conditions are maintained substantially uniform over a wide range of altitudes.

A further object of this invention is to provide heater apparatus which is simple and compact in construction, light in weight, and capable of operating efficiently and positively over a wide range of altitudes in which the atmosphere varies both in pressure and oxygen weight for a given volume of air.

Yet another object of this invention is to provide air heating apparatus for aircraft including a heat generating unit in which a substantially uniform amount of heat is carried away from said heat generating unit over a wide range of altitudes having varying air densities.

A feature of this invention is found in the provision of heater apparatus adapted for operation over a wide range of altitudes having atmospheres of varying pressures and oxygen weight for a given air volume in which air moving means for supplying air for combustion is operatively associated with a source of oxygen supply such that the oxygen from such supply is fed for combustion at a controlled rate after a predetermined altitude and corresponding oxygen weight for a given air volume has been reached.

Further objects, features, and advantages of this invention will become apparent from the following description when taken in connection with the accompanying drawings in which:

Fig. 1 is a longitudinal sectional view of a heater apparatus showing the assembly therewith of means providing for its operation over a wide range of altitudes, the combustion chamber being shown in development for the purpose of clarity;

Fig. 2 is a fragmentary elevational view partly in section showing an oxygen supply system in assembly relation with the heater apparatus in Fig. 1;

Fig. 3 is a fragmentary end view of the heater apparatus taken approximately along the line 3—3 in Fig. 1;

Fig. 4 is a sectional view of the combustion chamber as seen along the line 4—4 in Fig. 1;

Fig. 5 is a view illustrated similarly to Fig. 1 showing a modified form of the invention; and Fig. 6 is a control circuit applicable to both of the heater devices shown in Figs. 1 and 5.

In practicing this invention there is provided a heater apparatus of internal combustion type adapted for space heating in an aircraft. The heater includes a combustion chamber operatively associated with a fuel conditioning unit having heating means for heating the same to at least a fuel vaporizing temperature. Atmospheric air, oxygen or a mixture of atmospheric air and oxygen is fed into the conditioning unit to form with the fuel therein a combustible mixture for burning in the combustion chamber. The air to be heated is directed through a passage in thermal relation with the combustion chamber with the means for circulating the air to be heated and for supplying the air for combustion to the conditioning unit, and hence to the combustion chamber, being operated by a common electric motor. The admission of air to the heated air passage and to the conditioning unit is controlled by adjustable damper means operated by atmospheric pressure responsive means. Since the atmosphere becomes more rare and the weight of oxygen for a given volume of air is reduced with an increase in altitude, the damper means are operated to permit more air to be moved by the air moving means with an increase in altitude. The increase in the quantity of air at high altitudes as controlled by the damper means is augmented by means operated concurrently with the damper means to increase the speed of the motor with an increase in altitude. Where oxygen alone is supplied for combustion the means supplying combustion air and its associated damper means are eliminated. When oxygen is supplied alone or in conjunction with combustion air it is fed to the conditioning unit at a controlled rate dependent upon the altitude of heater operation. In those instances where it might be necessary to vary the fuel supply to the conditioning unit to maintain a substantially uniform weight ratio of fuel to oxygen at all altitudes, there is provided further means for varying the rate of fuel supply after some predetermined altitude has been reached in which a variable fuel feed is desired.

Referring to Fig. 1 of the drawings the heater of this invention is seen to include a housing 10 which is divided longitudinally thereof over substantially its entire length by a vertically extending partition member 11 to provide a mechanical compartment 12 and a heating compartment. Within the heating compartment is a substantially cylindrically shaped combustion chamber 13, shown in development in Fig. 1 for the purpose of clarity, which is closed at one end by a cover plate 14 and at its opposite end by the bottom 16 of a substantially dish-shaped member 17 which defines in part an air supply chamber 18 in axial alignment with the combustion chamber 13.

The combustion chamber 13 is divided longitudinally thereof into four axially extending but connected passages 19a—19d by a partition member 21 of substantially X-shape (Figs. 1 and 4). The combustion chamber inlet 22 and outlet 23 are formed in the bottom portion 16 of the dish-shaped member 17 in communication with the passages 19a and 19d, respectively. Located within the inlet 22 is an air and fuel mixing unit, indicated generally as 24, which is extended within the air supply chamber 18. The outlet 23 is provided with a tail pipe 26 extended through the air supply chamber 18 and outwardly from the heater at the housing end 27.

The outer wall or body portion of the combustion chamber 13 is provided with angularly spaced axially extending fins 28. The fins 28 have a sleeve 29 positioned about the outer ends thereof to form an annular passage 31 about the combustion chamber 13 for the air to be heated. The air to be heated is admitted into the passage 31 through an inlet 32 connecting the passage with the mechanical compartment 12 and is circulated through the passage 31 by a fan 33 located within the comartment 12 and mounted on a shaft 34 for an electric motor 36 which is of series wound type. The compartment 12 and air passage 31 are separated from the air supply chamber 18 by a sealing or partition member 37 extended transversely of the housing 10. From Fig. 1 it is seen that the air supply chamber 18 is defined by the member 17, the partition member 37, and the end 27 of the housing 10. Air circulated by the fan 33 is thus confined to travel within the compartment 12 and passage 31 and is discharged from the passage through an outlet 38 which is connected to a space to be heated.

The air supply chamber 18 receives air from a fan 39 located therein and mounted on the motor shaft 34 which is journalled in the partition plate 37. In one embodiment of the invention the air in the chamber 18 is at a pressure of about two inches of water. An inlet 41 for the fan 39 is provided in the housing end 27. It is seen, therefore, that the fans 33 and 39 are operated by the motor 36 and are mounted directly on the shaft 34 thereof. The motor 36 is also utilized in the operation of a fuel pump 42 which is illustrated as being of solenoid type. The breaker assembly 43 for controlling the energization of the pump 42 is operatively associated with the motor shaft 34. Fuel for the pump 42 is supplied thereto from a suitable source (not shown) through a pipe 44 and is delivered through a pipe 46 to a fuel injection nozzle 47 formed as a part of the air and fuel mixing means 24. The pump 42, motor 36, and fan 33 are thus all located within the mechanical compartment 12, which is provided with an inlet 48 to supply either fresh or recirculated air to the fan 33 for delivery to the air passage 31.

The air and fuel mixing means 24, previously mentioned, includes a casing member 49, which is closed at one end and open at the end 51 thereof with the passage 19a (Fig. 1). A mixing chamber 52 located at the closed end of the casing 49 is separated from an equalizing chamber 53 by a perforated plate member 54. The equalizing chamber 53 in turn is both defined and separated from the combustion chamber passage 19a by a perforated heat insulating plate 56 spaced inwardly from the end 51 of the casing 49. Extended substantially axially through the casing 49 and supported in the partition plates 54 and 56 and projecting outwardly from the closed end of the casing 49 is a combination electric heating and igniting unit 57 which includes a resistance coil 58 supported in a spaced relation within a metal tube 59.

In the operation of the air and fuel mixing means 24 the fuel delivered to the nozzle 47 by the pump 42 is directed into the mixing chamber 52, the fuel nozzle being located within the air supply chamber 18 and mounted directly on the casing 49 at the mixing chamber 52 (Fig. 1). A portion of the air for mixing with the fuel enters the nozzle 47 from the air chamber 18 through ports 61 in the fuel nozzle and travels with this fuel into the mixing chamber 52. Additional air from the air chamber 18 is admitted directly into the mixing chamber 52 through apertures 62 formed in the casing 49 about the fuel injection nozzle 47. The fuel within the mixing chamber 52 is heated to at least a fuel vaporizing temperature by the combination unit 57 to facilitate its thorough mixing with the air. The casing 49, partition plate 54 and tube 59 are provided in a heat conducting material so as to readily receive and conduct the heat radiated by the coil 58. The vaporous air and fuel mixture passes through the perforated plate 54 into the equalizing chamber 53 which in cooperation with the perforated insulating plate 56 acts to reduce the turbulence in the mixture and to disperse the mixture substantially uniformly over the entire cross section of the casing 49. This combustible mixture passes through the apertured plate 56 and across the open end 63 of the tube 59 into the effective igniting zone of the combination unit 57 which functions as a heat gun. In other words the heat developed by the coil 58 is projected outwardly from the open end 63 of the tube 59, the heat generated being dependent upon the watt input to the resistance coil 58. The combustible mixture is thus ignited by virtue of the temperature at the end 63 of the tube 59 being of a degree capable of igniting such mixture without the mixture itself directly contacting the coil 58.

The operation of the heater is best understood from Figs. 1 and 6. Admission of fuel to the pump 42 is controlled by a valve unit 64 connected in the supply line 44 and including a valve portion 66. The portion 66 extends through the unit 64 and has a handle at one end and is operatively connected at its opposite end with a control switch 67. On movement of the valve portion 66 to a full closing position for the valve unit 64, the switch 67 is operated to an open position so that the pump 42, motor 36, and combination unit 57 are turned off concurrently with the shutting off of the fuel supply to the pump. As shown in Fig. 6 the circuit for the pump 42 with the switch 67 in a closed position as indicated in dotted lines, includes a battery 68, conductor 69, switch 67, terminal 71, pump 42, breaker assembly 43 and a ground connection 72. The motor 36 and combination unit 57 are connected in series in a common circuit which from the battery 68 includes conductor 69, switch 67, terminal 73, conductor 74, a rheostat control arm 76 and a rheostat resistance 77 which will be later explained, a motor field coil 78, the motor 36, resistance coil 58, and a ground connection 79.

The switch 67 includes a switch arm 81 having a sliding contact 82 which coacts with the terminals 71 and 73 to separately open and close the pump circuit, and the circuit for the motor and electrical unit 57. Thus as shown in full lines in Fig. 6 the switch 67 is in an open position which corresponds to a closed position of the fuel valve unit 64. As the valve portion 66 is moved in a counterclockwise direction, as viewed in Fig. 6, to open the fuel line 44 the contact 82 initially closes with the terminal 73 to close the circuit for the motor 36 and combination unit 57. As the valve unit 64 continues to be opened the contact 82 while remaining closed with the terminal 73 closes with the terminal 71 to close the pump circuit. It is seen, therefore, that the operation of the pump 42 is delayed relative to the operation of the motor and heating unit 57 so that a scavenging action is initiated in the combustion chamber 13 prior to the admission of fuel thereto. On closing of the valve unit 64, and in turn moving of the switch 67 from its dotted to its full line position as shown in Fig. 6, the pump circuit is opened prior to the circuit of the motor and electric heating unit to provide for a delayed operation of the motor so that a scavenging action is continued in the combustion chamber after the fuel supply thereto has been cut off. This operation of the motor relative to the operation of the pump 42 serves to prevent any excess of fuel being present in the combustion chamber when heater operation is initiated.

As was previously mentioned the motor 36 is of series wound type so that it inherently seeks a speed at which it will operate at full load. In other words the motor operates to retain a constant load thereon regardless of the speed of its operation. When the heater is operated at altitudes approaching 20,000 feet the speeding up of the motor 36, resulting from the reduced air load on the fans by the decreased density of the air at such altitudes, is sufficient to compensate for the reduced air density so that a substantially constant supply of oxygen is fed through the inlet 41 to the mixing means 24 and hence to the combustion chamber 13 to retain therein a combustion condition which is substantially equal to the combustion conditions at ground level. This increase in speed, however, is not always great enough to maintain a ground level combustion condition at altitudes in excess of about 20,000 feet. In order, therefore, to maintain ground level heater operation at altitudes above 20,000 feet and up to about 50,000 feet under all possible conditions of construction, installation, and operation for the heater apparatus further compensation for the increased rarification in the air and reduction in oxygen weight in a given volume of air is provided by means now to be described.

With reference to Fig. 1 the inlet 41 to the air supply chamber 18 is operatively associated with damper means 83 for controlling the passage of air therethrough to the combustion chamber 13. The damper means is illustrated as being of a usual type including louvers 84 connected to a common actuating member 86 for simultaneous movement to open and closed positions relative to the inlet 41. The actuating member 86 is operated by a bellows unit 87 which is responsive to variations in atmospheric pressures to operate the louvers.

The bellows unit 87 is comprised of mating diaphragms 88 composed of a flexible metal or like material forming a closed space having a spring 89 therein acting to push the diaphragms apart. The space between the diaphragms 88 is evacuated to a pressure of substantially zero pounds while the pressure of the spring 89 is such that at ground level the atmospheric pressure is sufficient to press or squeeze the diaphragms to a closed position. It is readily apparent, of course, that a closed position of the bellows does not indicate a closed position of the damper means since the louvers 84 are retained partially open at ground level to admit sufficient air into the supply chamber 18 to maintain proper combustion. Further the spring 89 may be calibrated so that the bellows unit 87 is held closed up to an altitude at which a control of the damper means is desired. This is accomplished by setting the spring pressure to correspond to the pressure at the desired altitude. As is illustrated in Fig. 1 the bellows unit 87 is carried on a bracket 91 in a manner such that the movement of the diaphragms 88 is additive relative to the actuating bar 86. In other words the movement of the bar is double the movement of each diaphragm 88.

To efficiently operate the heater at all altitudes the power available for the operation of the motor 36, the capacity or size of the fan 39, and the size of the inlet 41 at full open position are relatively determined to provide for a supply of air having enough oxygen therein for proper combustion at the highest altitude at which the heater is to operate. When this relation is determined the opening 41 and the power supplied to the motor 36 are relatively and progressively decreased to provide for the efficient operation of the heater at ground level. Since the louvers are intended to be wide open only at the extreme altitude of 50,000 feet and corresponding rarified atmosphere, a partially closed position of the louvers at ground level and corresponding heavier atmosphere permits the delivery of an oxygen supply to the combustion chamber which is substantially equal to the supply of oxygen at the high altitude. In the operation of the heater, therefore, as the atmospheric pressure is reduced with an increase in altitude the bellows unit 87 is expanded by the action of the spring 89 to progressively move the louvers 84 to a wide open position. This progressive change in the size of the inlet opening 41 as varied by the louvers 84 continues until the louvers are in their wide open position corresponding to the highest altitude at which the heater is adapted to operate with ground level efficiency. As a result of the air becoming less dense with an increase in altitude the load on the motor produced by the fan decreases so that the motor increases in speed concurrently with the movement of the louvers to their open position. The increase in the speed of operation of the motor 36 and hence of the fan 39 over the entire range of altitudes at which the heater is to operate is accomplished by means now to be described.

As previously mentioned the size of the fan 39, the power applied on the motor 36 and the size of the opening 41 are relatively determined to compensate for the reduced oxygen weight for a given volume of air in the rarified atmospheres at high altitudes. The size of the fan 39 relative to the motor 36 is such that at ground level the motor is substantially incapable of operating the fan when the louvers 84 are in a wide open position. In other words the fan is oversize relative to the motor for operation at ground level with the louvers 84 entirely open. The louvers 84, therefore, are only partially open at ground level to permit an operation of the fan 39 by the motor 36 which provides sufficient air for combustion. However, with an increase in altitude and a resultant decrease in the air load on the fan 39 the louvers 84 may be progressively opened without stalling the motor 36.

In the operation of a series wound motor, the increase in speed thereof is directly proportional to the reduction in the load thereon up to a limit which might be termed a "flat point" or "point of constant speed." In other words the direct ratio of speed to load continues in a straight line curve up to a flattening out point thereon at which the speed remains substantially constant. This increase in the speed of a series motor with a reduction in load is often referred to as the "unwinding" of the motor. The "unwinding" characteristic of a series type motor is utilized in the present invention to provide for a substantially continuous increase in the speed of operation of the motor over the entire range of altitudes at which the heater is to operate.

Thus referring to Fig. 3 there is shown a voltage regulator 92 carried on the housing end 27 and having a regulating arm 76 operatively connected to the actuating member 86 for operation by the bellows unit 87. The voltage regulator or rheostat 92 functions to increase the power applied to the series wound motor 36 with an increase in altitude to augment the speeding up of the motor resulting from its being of series wound type. Thus for example assume the voltage regulator at ground level to be adjusted such that the voltage applied on the motor 36 is only about 60% of its rated voltage. With an increase in the altitude and corresponding decrease of the air load on the fan 39, the motor 36 while operating at 60% of its rated voltage will "unwind" or increase in speed a predetermined amount as was fully explained above. However, on applying further voltage to the motor 36, for example a voltage corresponding to its rated voltage there will occur a second "unwinding" or increase in the speed of the motor. This continuous increase in speed may be continued further by applying a voltage on the motor in excess of its rated voltage so that a third "unwinding" thereof occurs. It is seen, therefore, that the series motor 36 operates to continuously increase in speed with a reduction in load thereon for each voltage at which it is operated. Thus by varying the voltage applied thereon from some value below its rated voltage to a value above its rated voltage a continuous increase in speed thereof over a wide speed range can be obtained. This operation of the motor 36 in conjunction with the use of an oversized fan and adjustable louvers 84 provides for a wide compensation for the reduction in oxygen weight for a given volume of air in the rarified atmospheres at high altitudes so that by increasing the volume of air delivered at high altitudes the supply of oxygen at all altitudes is maintained substantially constant. Combustion conditions over the entire range of altitudes at which the heater is operated are thus retained substantially uniform. It is to be understood of course that in those instances where a series wound motor is not utilized that the rheostat control of this invention may be used to progressively increase the speed of operation of some other type motor.

Since the speed of the motor 36 as controlled by the voltage regulator 92 might not be required until after some predetermined altitude, the operation of the voltage regulator may be delayed until such predetermined altitude is reached. Thus as shown in Fig. 3 the regulating arm 76 is mounted for pivotal movement on a shaft 93 which also carries an arm 94 having a slot 96 therein for receiving a pin 97 mounted on a link 98 carried on the actuating bar 86. It is seen, therefore, that the arm 76 remains stationary until the lost motion in the pin and slot connection is taken up after a predetermined movement of the actuating arm 86 by the bellows unit 87.

In some instances of heater operation at extremely high altitudes it might be necessary to supplement the oxygen supplied by the means above described. Thus as shown in Fig. 1 the supply chamber 18 is fluid connected through a pipe 99 with a source of oxygen illustrated in Fig. 2 as a usual oxygen tank 101 in which the oxygen is maintained under a pressure. A reduction valve 102 of a well known type is utilized to reduce the high pressure in the tank 101 to some predetermined pressure in the line 99, which is provided with a valve unit 103 for controlling the flow of oxygen from the tank 101 to the chamber 18.

The valve unit 103 includes a valve member 104 which is in a lost motion connection of pin and slot type with a diaphragm 88' of a bellows unit 87' carried on a bracket 106 supported from the valve unit 103. By virtue of the lost motion connection between the valve member 104 and the bellows unit 87' the valve 103 remains in a closed position to prevent a flow of oxygen to the chamber 18 until an altitude is reached at which the bellows unit is extended sufficiently to take up the lost motion and lift the valve member 104 from its associated seat 107. When this lifting occurs oxygen from the tank supplements the oxygen in the air supplied to the chamber 18 by the fan 39 for burning in the combustion chamber 13.

Although the air supplied by the fan 39 is increased with an increase in altitude the increased volume of air is furnished at a reduced density so that these two factors act in a complementary relation to retain the pressure in the chamber 18 substantially uniform. As was previously mentioned the air in the chamber 18 is at a pressure of approximately two inches of water. The operation of the fan 39 to retain this pressure uniform is aided by the predetermined pressure at which the oxygen is supplied to the chamber 18. From a consideration of Fig. 2 it is apparent that the oxygen supply as controlled by the bellows unit 87' and valve unit 103 increases with an increase in altitude and that such oxygen is always supplied under the pressure provided in the line 99. A substantially uniform pressure is thus maintained in the chamber 18 over the entire range of altitudes at which the heater is to operate.

In conjunction with the oxygen control it may be found necessary under some conditions of operation to change the rate of fuel supply to the conditioning means 24. To maintain a substantially uniform fuel mixture at all altitudes the rate of fuel supply may be varied concurrently with the variation in the oxygen supply over a portion of the range of altitudes at which the heater is to operate. Thus referring to Fig. 1 there is shown a bellows unit 87a and an actuating member 86a for damper means 83a which are constructed and operated in all respects similar to the bellows 87 and actuating bar 86 associated with the air supply inlet 41. The bar 86a is formed with a slot 108 adapted to receive a pin 109 carried at one end of a pivoted link member 111. The opposite end of the link member 111 is pivotally connected with a valve member 112 formed as a part of a valve unit 113 connected in the fuel supply line 46. The pin and slot connection 108—109 provides for a lost motion between the bar 86a and the link 111 so that movement of the link 111 is not immediately responsive to the expansion of the bellows unit 87a. In other words, the supply of fuel to the conditioning means 24 is not varied in response to atmospheric conditions until an altitude is reached at which the pin 109 is in driven engagement with the bar 86a. After this engagement takes place the air and fuel supplied to the combustion chamber is concurrently varied in response to the barometric pressures acting on the bellows unit 87a and 87. It is to be understood, of course, that under some conditions of operation the fuel may be varied over the complete range of altitudes at which the heater is to operate.

This control of the air and fuel results in combustion conditions in the heater being maintained substantially uniform at all altitudes to in turn provide for a substantially uniform generation of heat within the combustion chamber 13. Because of the reduction in the density of the air as the altitude is increased additional air must be circulated through the passage 31 to remove the heat available for air heating purposes. In other words if the fan 33 is operated at a constant speed the heat removed from the combustion chamber decreases with an increase in altitude. An increase in the quantity of air circulated in the passage 31, as the altitude increases, is attained to an appreciable extent by the inherent speeding up of the series motor 36. Additional control of the motor speed is accomplished by the voltage regulator 92. A further control of the air admitted into the mechanical compartment 12 at the inlet 48 thereof is provided by the damper means 83a similar in all respects in construction and operation to the damper means 83 associated with the air supply inlet 41. The louvers 84a are connected to the actuating member 86a so that the bellows unit 87a operates both the damper means 83a and the fuel valve 113. In view of the above description and operation of the bellows unit 87 and damper means 83 it is believed that a further description of the bellows unit 87a and damper means 83a is unnecessary. It is seen, therefore, that the oxygen, air and fuel supplied for combustion and the air supplied to the passage 31 may be relatively varied by barometric pressure responsive means so as to maintain the overall operation of the heater substantially the same at all altitudes.

The embodiment of the invention shown in Fig. 5 is substantially similar in all respects to the heater apparatus shown in Fig. 1 except that the air supply fan 39 and its associated air control mechanism 87—83 is eliminated. Similar numerals of reference will be used, therefore, to designate similar parts. The control circuit of Fig. 6 previously described in connection with Fig. 1 is also applicable to the heater apparatus of Fig. 5.

Thus referring to Fig. 5 the chamber 18 is connected with the oxygen system in Fig. 2 through the pipe 99. Since the air supply fan 39 is eliminated the fuel supplied to the conditioning means 24 by the pump 42 is mixed only with oxygen over the entire range of altitudes at which the heater is to operate. As a result the valve member 104 of the valve unit 103 connected in the pipe 99 is adapted to be retained in a partially open position at ground level by the bellows unit 87' so that sufficient oxygen is admitted into the chamber 18 for satisfactory combustion in the combustion chamber 13. The pressure in the line 99 at the reduction valve 102 is such that a pressure of about two inches of water is retained in the chamber 18.

As shown in Fig. 5 the tail pipe 26 at the combustion chamber outlet 23 is open to the atmosphere. With an increase in altitude, therefore, and a corresponding reduction in the air density there is produced a corresponding reduction in the atmospheric or back pressure acting on the outlet 23. By virtue of this reduced pressure at the outlet the velocity of the mixture flow in the combustion chamber 13, and specifically through the interconnected passages thereof, tends to increase with an increase in altitude to reduce the pressure within the chamber 18. In other words the decrease in back pressure at the combustion chamber outlet 23 provides an effect which might be compared to an increase in the size of the outlet openings from the chamber 18. This reduction in back pressure at the outlet 23 with an increase in altitude is compensated for by the action of the bellows unit 87' which operates to continue the opening of the valve unit 103 with an increase in altitude so that the pressure within the chamber 18 is retained substantially uniform over all altitudes at which the heater is designed to operate.

The operation of the air circulating fan 33 and its associated air control mechanism at the inlet 48 is similar in all respects to the like parts described in connection with Fig. 1 so that a further description thereof is believed to be unnecessary. This also applies to the operation of the fuel valve 113 and the voltage regulator 92 for the motor 36. This embodiment of the invention thus provides a heater adapted to operate over an entire range of altitudes with substantially uniform operating conditions, while utilizing a known supply of oxygen as the sole combustion supporting medium.

From a consideration of the above description and drawings, therefore, it is seen that the invention provides heater apparatus capable of operating over a wide range of altitudes with substantially uniform operating conditions while utilizing either air or oxygen alone for mixing with the fuel to be burned, or by using proportional amounts of air and oxygen together. The supplies of air and oxygen are controlled to maintain the operating conditions of the heater, and more particularly the weight ratio of fuel to air, substantially uniform over the entire range of altitudes so that the heat output is maintained substantially uniform. Means are also provided to control the quantity of air circulated in thermal relation with the combustion portion of the heater apparatus so that all of the available heat for air heating purposes is continuously carried away from such portion. The complete apparatus is automatic in operation and comprised of but few easily adjustable parts so that servicing and maintenance providing for the satisfactory operation of the heater is reduced to a minimum.

Although the invention has been described with reference to several preferred embodiments thereof it is to be understood that modifications and alterations in the parts and changes in their relative arrangement can be made therein which are within the full intended scope of this invention as defined by the appended claims.

I claim:

1. In apparatus adapted to be installed aboard an aircraft to heat the craft while in flight at varying altitudes, means defining a combustion chamber, a source of oxygen in fluid flow relation with said combustion chamber for supplying oxygen under pressure thereto, adjustable means for controlling the flow of oxygen to said combustion chamber, a fuel supply system including other adjustable means for varying the fuel feed to said combustion chamber, and means responsive to atmospheric pressures acting on said two adjustable means to retain the pressure and weight ratio of fuel to oxygen in said combustion chamber substantially uniform over said range of altitudes.

2. In aircraft heating apparatus adapted to be installed aboard an aircraft to heat the craft while in flight at varying altitudes, means defining a combustion chamber, air moving means for supplying combustion air to said combustion chamber, means for supplying fuel to said combustion chamber, adjustable means operatively associated with said air moving means to control the flow of air to said combustion chamber, oxygen supply means for said combustion chamber including other adjustable means controlling the feed of oxygen to said combustion chamber, and means responsive to atmospheric pressures at various altitudes for separately acting on said first adjustable means to increase the flow of air through said inlet with an increase in altitude and on said other adjustable means to feed oxygen to said combustion portion at a substantially predetermined altitude.

3. In aircraft heating apparatus adapted to be installed aboard an aircraft to heat the craft while in flight at varying altitudes, means defining a combustion chamber, air moving means for delivering air to said combustion chamber, adjustable means for controlling the delivery of air to said combustion chamber, an oxygen supply system for said combustion chamber including other adjustable means controlling the supply of oxygen to said combustion chamber, a fuel supply system for said combustion chamber including means for controlling the feed of fuel thereto, and means responsive to atmospheric pressures acting on said first adjustable means to increase the flow of air to said combustion chamber with an increase in altitude, and operating said other adjustable means and fuel feed control means at an altitude having a predetermined atmospheric pressure and corresponding oxygen weight for a given volume of air.

4. In aircraft heating apparatus adapted to be installed aboard an aircraft to heat the craft while in flight at varying altitudes, means defining a combustion chamber, means for delivering fuel to said combustion chamber, air moving means for delivering combustion air to said combustion chamber, an electric motor for operating said air moving means, a circuit for said motor including a source of power supply and adjustable means for varying the power applied on said motor, an oxygen supply system for said combustion chamber including means controlling the feed of oxygen to said chamber, and altitude responsive means acting on said adjustable means to increase the power applied on said motor with an increase in altitude, and on said control means to feed oxygen to said chamber after a predetermined altitude is reached.

5. In aircraft heating apparatus adapted to be installed aboard an aircraft to heat the craft while in flight at varying altitudes, means defining a combustion chamber, means for delivering fuel to said combustion chamber, air moving means for delivering combustion air to said combustion chamber, an electric motor of the series wound type for operating said air moving means whereby a reduction in air density with an increase an altitude provides for a corresponding increase in the speed of operation of said motor and whereby the volume of air delivered to said combustion chamber increases with an increase in the altitude of operation of said craft, an oxygen supply system for said combustion chamber including means controlling the feed of oxygen to said chamber, and altitude responsive means acting on said control means to feed oxygen to said combustion chamber after an altitude is reached having a predetermined oxygen weight for a given volume of air.

6. In aircraft heating apparatus adapted to be installed aboard an aircraft to heat the craft while in flight at varying altitudes, means defining a combustion chamber, means for delivering fuel to said combustion chamber, air moving means for delivering combustion air to said combustion chamber, an electric motor of the series wound type for operating said air moving means, whereby a reduction in air density with an increase in altitude provides for a corresponding increase in the speed of operation of said motor and whereby the volume of air delivered to said combustion chamber increases with an increase in the altitude of operation of said craft, a circuit for said motor including adjustable means for varying the power applied thereon, an oxygen supply system for said combustion chamber including means controlling the feed of oxygen to said combustion chamber, and altitude responsive means acting on said adjustable means to increase the power delivered to said motor with an increase in altitude, and acting on said control means to feed oxygen to said portion after an altitude is reached having a predetermined oxygen weight for a given volume of air.

7. In aircraft heating apparatus adapted to be installed aboard an aircraft to heat the craft while in flight at varying altitudes, means defining a combustion chamber, means defining an air and oxygen pressure chamber having an air inlet and from which a mixture of combustion air and oxygen are delivered to said combustion chamber, means for delivering fuel to said combustion chamber, air moving means for delivering air to said pressure chamber through said inlet, an oxygen container, means for delivering oxygen from said container to said pressure chamber for mixture with the air therein, means for preventing oxygen from being delivered to said pressure chamber when said aircraft is operated at less than a predetermined altitude and for varying the rate of oxygen delivery to said pressure chamber in the same sense with changes in the altitude at which said craft is operated when said aircraft is operated at altitudes in excess of said predetermined altitude, and means for automatically varying the volume of air delivered to said pressure chamber in the same sense with changes in the altitude at which the craft is operated, whereby a volume of oxygen entirely adequate to support combustion is supplied to said combustion chamber over a wide altitude range.

8. In aircraft heating apparatus adapted to be installed aboard an aircraft to heat the craft while in flight at varying altitudes, means defining a combustion chamber having an inlet, means defining an air and oxygen pressure chamber adjacent the inlet to said combustion chamber, an air and fuel mixing device disposed in said pressure chamber and having a mixing zone communicating both with said combustion chamber and said pressure chamber, whereby air or a mixture of air and oxygen may be delivered to said combustion chamber from said pressure chamber by way of said mixing zone, means for delivering fuel to said mixing zone for mixture with the air and oxygen therein, an oxygen container, air moving means for delivering air to said pressure chamber, means for delivering oxygen from said container to said pressure chamber for mixture with the air therein, means for preventing oxygen from being delivered to said pressure chamber when said aircraft is operated at less than a predetermined altitude and for varying the rate of oxygen delivery to said pressure chamber in the same sense with changes in the altitude at which said craft is operated when said craft is operated at altitudes in excess of said predetermined altitude, and means for automatically varying the volume of air delivered to said pressure chamber in the same sense with changes in the altitude at which the craft is operated, whereby a volume of oxygen entirely adequate to support combustion is supplied to said combustion chamber over a wide altitude range.

9. In aircraft heating apparatus adapted to be installed aboard an aircraft to heat the craft while in flight at varying altitudes, means defining a combustion chamber having an inlet, means defining an air and oxygen pressure chamber adjacent the inlet to said combustion chamber, an air and fuel mixing device disposed in said pressure chamber and having a mixing zone communicating both with said combustion chamber and said pressure chamber, whereby air or a mixture of air and oxygen may be delivered to said combustion chamber from said pressure chamber by way of said mixing zone, adjustable means for delivering fuel to said mixing zone at a variable rate for mixture with the oxygen and air therein, air moving means for delivering air to said pressure chamber, and oxygen container, means for delivering oxygen from said container to said pressure chamber for mixture with the air therein, means for preventing oxygen from being delivered to said pressure chamber when said craft is operated at less than a predetermined altitude and for varying the rate of oxygen delivery to said pressure chamber in the same sense with changes in the altitude at which said craft is operated when said craft is operated at altitudes in excess of said predetermined altitude, means for automatically varying the volume of air delivered to said pressure chamber in the same sense with changes in the altitude at which the aircraft is operated, and altitude responsive means for so controlling said adjustable fuel delivery means that a reasonably uniform fuel to oxygen ratio is maintained in the mixture delivered from said mixing zone to said combustion chamber over a wide altitude range.

HARRY B. HOLTHOUSE.